(12) United States Patent
Koch et al.

(10) Patent No.: US 10,478,363 B2
(45) Date of Patent: Nov. 19, 2019

(54) CLAMPING CLAW FOR MOUNTING ON A SLIDING RAIL OF AN OPERATING TABLE

(71) Applicant: MAQUET GMBH, Rastatt (DE)

(72) Inventors: Guido Koch, Karlsruhe (DE); Bernhard Katzenstein, Iffezheim (DE)

(73) Assignee: MAQUET GMBH, Rastatt (DE)

( * ) Notice: Subject to any disclaimer, the term of this patent is extended or adjusted under 35 U.S.C. 154(b) by 851 days.

(21) Appl. No.: 15/008,660

(22) Filed: Jan. 28, 2016

(65) Prior Publication Data

US 2016/0136028 A1    May 19, 2016

Related U.S. Application Data

(63) Continuation-in-part of application No. PCT/EP2014/067053, filed on Aug. 8, 2014.

(30) Foreign Application Priority Data

Aug. 8, 2013   (DE) .......................... 10 2013 108 574

(51) Int. Cl.
*A61G 13/10*        (2006.01)
*F16B 2/06*         (2006.01)
(Continued)

(52) U.S. Cl.
CPC .............. *A61G 13/101* (2013.01); *F16B 2/06* (2013.01); *F16B 2/185* (2013.01); *F16M 13/022* (2013.01)

(58) Field of Classification Search
CPC combination set(s) only.
See application file for complete search history.

(56) References Cited

U.S. PATENT DOCUMENTS 3,046,072 A * 7/1962 Douglass, Jr. ......... A61G 13/12
                                                  5/623
4,143,652 A * 3/1979 Meier .................... A61B 17/02
                                                  600/203
(Continued)

FOREIGN PATENT DOCUMENTS

CN       102149883 A    8/2011
DE       31 49 215 A1   6/1983
(Continued)

OTHER PUBLICATIONS

Chinese Office Action and Chinese Search Report (Chinese and English translations) dated Jan. 5, 2017, issued for corresponding Chinese application No. 201480049137.4, 11 pages.

(Continued)

*Primary Examiner* — Monica E Millner
(74) *Attorney, Agent, or Firm* — Aaron M. Miller

(57) ABSTRACT

An operating table clamp is disclosed. The operating table clamp has a base body, a clamp assembly disposed on the base body, the clamp assembly having at least one bearing member configured to bear against the operating table member, and an activating member that is connected to the clamp assembly, the clamp assembly being brought by the activating member into a locked state in which the bearing member of the clamp assembly bears against the operating table member. In the locked state of the clamp assembly, the bearing member engages with an edge region of the operating table member, the edge region including an edge that is disposed between a first operating table member surface and a second operating table member surface, the first and second operating table member surfaces being angled relative to each other.

20 Claims, 7 Drawing Sheets

(51) Int. Cl.
*F16B 2/18* (2006.01)
*F16M 13/02* (2006.01)

(56) References Cited

U.S. PATENT DOCUMENTS

| | | | | |
|---|---|---|---|---|
| 4,901,963 | A * | 2/1990 | Yoder | B25B 5/103 |
| | | | | 24/489 |
| 5,701,991 | A * | 12/1997 | Helmetsie | B65G 21/2072 |
| | | | | 198/836.1 |
| 5,802,636 | A * | 9/1998 | Corbin | A61G 7/05 |
| | | | | 5/425 |
| 5,836,559 | A * | 11/1998 | Ronci | A61G 13/101 |
| | | | | 248/230.3 |
| 6,622,980 | B2 | 9/2003 | Boucher et al. | |
| 7,159,832 | B2 * | 1/2007 | Easterling | A61G 15/10 |
| | | | | 24/455 |
| 7,624,958 | B2 * | 12/2009 | Ropertz | A61G 13/101 |
| | | | | 248/226.11 |
| 7,731,141 | B2 * | 6/2010 | Schuerch | A61G 13/101 |
| | | | | 248/218.4 |
| 8,011,629 | B2 * | 9/2011 | Herskovic | A61G 7/0503 |
| | | | | 248/229.13 |
| 8,499,484 | B2 * | 8/2013 | Schneider | F41G 1/387 |
| | | | | 340/505 |
| 8,833,707 | B2 * | 9/2014 | Steinberg | A61G 13/102 |
| | | | | 128/849 |
| 9,107,784 | B2 * | 8/2015 | Doyle | A61G 7/05 |
| 10,238,569 | B2 * | 3/2019 | Hafner | A61G 13/101 |
| 2006/0255220 | A1 * | 11/2006 | Skripps | A61G 13/04 |
| | | | | 248/228.4 |
| 2007/0136947 | A1 | 6/2007 | Limpert | |
| 2010/0117281 | A1 * | 5/2010 | Doyle | F16B 2/10 |
| | | | | 269/97 |

FOREIGN PATENT DOCUMENTS

| | | |
|---|---|---|
| DE | 101 47 588 A1 | 4/2003 |
| DE | 10 2009 021224 A1 | 11/2010 |
| DE | 20 2011 101422 U1 | 8/2011 |
| RU | 74805 U1 | 7/2008 |
| WO | 2009/132458 A1 | 11/2009 |

OTHER PUBLICATIONS

International Search Report dated Nov. 28, 2014 issued for corresponding international application No. PCT/EP2014/067053, 2 pages.
Russian Office Action (with English translation) and Russian Search Report dated Mar. 26, 2018 issued for corresponding Russian patent application No. 2016107724, 11 pages.

* cited by examiner

CLAMPING CLAW FOR MOUNTING ON A SLIDING RAIL OF AN OPERATING TABLE

CROSS REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2014/067053, filed Aug. 8, 2014, and which designates the United States of America, and German Patent Application No. 10 2013 108 574.1, filed Aug. 8, 2013. The disclosures of these applications are herein incorporated by reference in their entirety.

TECHNICAL FIELD

This disclosure relates to a clamping claw for mounting on a sliding rail of an operating table.

BACKGROUND

Operating tables typically have sliding rails along the sides of their table segments, which generally have a rectangular cross section and serve to fasten accessories such as support aids in the desired position on the operating table. Clamping claws may be used to fasten the accessories, being coupled to the particular accessory and mounted on the sliding rail.

In some designs, such a clamping claw is formed as a clamplike part, which is placed on the sliding rail and then fixed in the desired position by a clamping screw. Further modified designs make it possible to swivel clamping claws to a desired place on the sliding rail and thus be fastened more quickly to the sliding rail without involving access from one end of the sliding rail.

Known embodiments of such clamping claws, also known as clamping blocks, are characterized in that a hook-shaped structure reaches across the upper end of the sliding rail, which is rectangular in cross section. In this process, inner flanks of the clamping claw tapering at an acute angle come to bear against the two upper lengthwise edges of the sliding rail, running parallel to each other. The gravity force of the clamping claw, which generally engages the outside of the operating table, rotates the latter until a side flank comes to bear against the upright outer surface of the sliding rail. A clamping element which is moved upward for example via a tommy screw in turn bears against the lower inner edge of the sliding rail with a slanting surface and secures the clamping claw after a prestressing is applied. The transmission of force from the clamping claw to the sliding rail occurs primarily via the edges of the sliding rail. Thus, depending on the design of the edge fillet, this results in different and relatively large surface pressures, which limit the force absorbing capacity of the clamping claw. The connection between clamping claw and sliding rail also may be soft and compliant, since the high load concentration can result in local deformations of the edges. Furthermore, the tolerances of the spacing dimensions and the edge fillets may accumulate (e.g., in the diagonals of the rectangular cross section). These tolerances have to be compensated for by the clamping element.

As for handling, fast clamping systems may be suitable, in which the mounting and prestressing of the clamping element occur by a single movement. This is made difficult by the required large travel of the clamping element.

The above explained problems are magnified in that the sliding rails in use are very different from each other in their dimensions and fillets. It has therefore been difficult thus far to provide a clamping claw which enables a simple and precise mounting of accessories on an operating table regardless of the particular sliding rail used.

SUMMARY OF THE DISCLOSURE

The present disclosure is directed to a clamping claw which enables a simple and secure mounting of an accessory on an operating table regardless of the particular sliding rail used.

The clamping claw according to the invention may have a base body and a clamping structure arranged on the base body, having at least one bearing element designed to bear against the sliding rail. Via an activating element, which may be operatively connected to the clamping structure, the clamping structure can be brought into a locked state in which the bearing element of the clamping structure bears against the sliding rail. In the locked state of the clamping structure, the bearing element may engage with at least one edge region of the sliding rail in which a rail edge is located between two rail surfaces generally inclined (e.g., angled) relative to each other by a right angle. The bearing element may have two contact surfaces and an edge recess disposed between the contact surfaces, which receives without contact the rail edge in the locked state of the clamping structure in which one of the two contact surfaces bears against one of the two rail surfaces and the other contact surface bears against the other rail surface.

The edge recess according to the invention may ensure that the bearing element engages flush (e.g., in a flush manner) with the edge region of the sliding rail, (e.g., the rail surfaces may be in contact with the bearing element in the edge region, while the rail edge itself may have no contact with the clamping claw). For example, only the rail surfaces may be in contact with the bearing element. Consequently, the fillet of the rail edge may not have any influence on the clamping force with which the clamping claw can be secured on the sliding rail. Accordingly, it may not be appropriate to consider tolerances related to the edge fillets for the particular sliding rail used when designing the clamping claw.

The clamping claw may have the capability of being able to be placed on the sliding rail and locked there with only one hand. Thus, the handling may be simplified.

The clamping structure may have a movably mounted clamping block, which may be operatively connected to the activating element and may have a clamping surface which can be tightened by activating (e.g., urging) the activating element against a surface of the sliding rail not affected (e.g., not contacted) by the bearing element. If one assumes a rectangular profile of the sliding rail placed upright, for example, a first bearing element (e.g., without the corresponding rail edge) may engage with the upper and inner side of the rectangle and a second bearing element (e.g., again without the corresponding rail edge) with the lower and inner side of the rectangle, while the clamping surface of the clamping block may be tightened against the outer side of the rectangle for the locking of the clamping structure. In this way, the clamping claw may be clamped securely against the sliding rail.

The clamping structure may have a cam coupled with the activating element, which may press the clamping surface of the clamping block against the surface of the sliding rail not affected (e.g., not contacted) by the bearing element when the activating element is activated. The use of a cam (e.g., one configured on a rotating shaft coupled with the activating element) may make it possible to tighten the clamping surface of the clamping block against the sliding rail in a simplified manner.

In an exemplary embodiment, the clamping block may be formed from a pressing piece operatively connected to the activating element and a bearing shoe, provided with the clamping surface, which may be mounted for example so that it can pivot on the pressing piece. The two-part swiveling design of the clamping block may provide for a secure clamping of the clamping block against the sliding rail in the locked state. For example, if a force is exerted on the clamping block, for example acting in the lengthwise direction of the sliding rail, this force may be absorbed in that the bearing shoe and the pressing piece may swivel relative to each other. Also for example, if the bearing shoe and the pressing piece were rigidly joined together, the clamping claw in the locked state may move along the sliding rail when the force overcomes the frictional resistance between the sliding rail and the bearing shoe.

The above explained embodiments may be modified in that the clamping surface of the bearing shoe may be formed from a central, planar surface segment and two arched surface segments, adjoining the planar surface segment at the sides. The surface segments may be arranged in the lengthwise direction of the sliding rail, e.g., a first arched surface segment may be followed in the lengthwise direction of the sliding rail by a central, planar surface segment and then by a second arched surface segment. Depending on the swivel position of the bearing shoe relative to the pressing piece, either the central, planar surface segment or one of the two side arched surface segments may lie against the sliding rail.

For example, the bearing shoe may be held by a spring-loaded detent element in a predetermined swivel position. The detent element can be formed from one or more spring-loaded balls. If the bearing shoe is able to swivel about a vertical axis, the predetermined swivel position in which the detent element holds the bearing shoe may be, e.g., a middle position, from which the bearing shoe can be deflected at either side along the horizontally running sliding rail against the pretensioning force exerted by the detent element.

In an exemplary embodiment, the clamping block may be a single piece and may have a bearing surface facing away from its clamping surface, (e.g., having a concave shape and being in contact with a pressing surface formed on the cam) having a convex shape corresponding to the concave shape of the bearing surface.

In an exemplary embodiment, the clamping surface of the clamping block may be preferably formed from a central, planar surface segment and two arched surface segments, adjoining the planar surface segment at the sides.

For example, the clamping block may be disposed with its end facing away from the clamping surface in a seat formed in the base body and may have at least two concave shaped bearing surfaces, lying against at least two abutments formed in the seat. Due to this type of mounting of the clamping block in the seat formed in the base body, the mobility of the clamping block may be limited in a desired manner.

In an exemplary embodiment, a yoke spring may be provided, which may lie in a recess formed in the clamping surface of the clamping block. The yoke spring may serve to close the chain of force to the shaft carrying the cam. Furthermore, the yoke spring may have the function of orienting the clamping block in the desired position in the unloaded state.

In an exemplary embodiment, at least two bearing elements may be provided, which in the locked state of the clamping structure may engage with the different edge regions of the sliding rail (e.g., engaging by their edge recesses with the respective rail edges such that they are accommodated for example without contact in the edge recesses). For example, the clamping claw can have two pairs of bearing elements, of which one pair engages with a lower edge region and the other pair with an upper edge region of the sliding rail.

In an exemplary embodiment, the at least one bearing element may comprise a swivel bar, which may be pivotally mounted at one end in the base body and at its free end may have two convex arched surfaces, which may form the contact surfaces. The convex shape of the contact surfaces may provide for the bearing elements having only a line contact with the rail surfaces coordinated with them, while the respective rail edge itself may be recessed (for example, having substantially no contact with the respective bearing element). In this way, a reliable locking of the clamping claw on the sliding rail may be achieved.

BRIEF DESCRIPTION OF THE DRAWINGS

The invention shall be explained more closely based on the exemplary embodiments illustrated in the figures. There are shown.

DETAILED DESCRIPTION AND INDUSTRIAL APPLICABILITY

Figure 1:
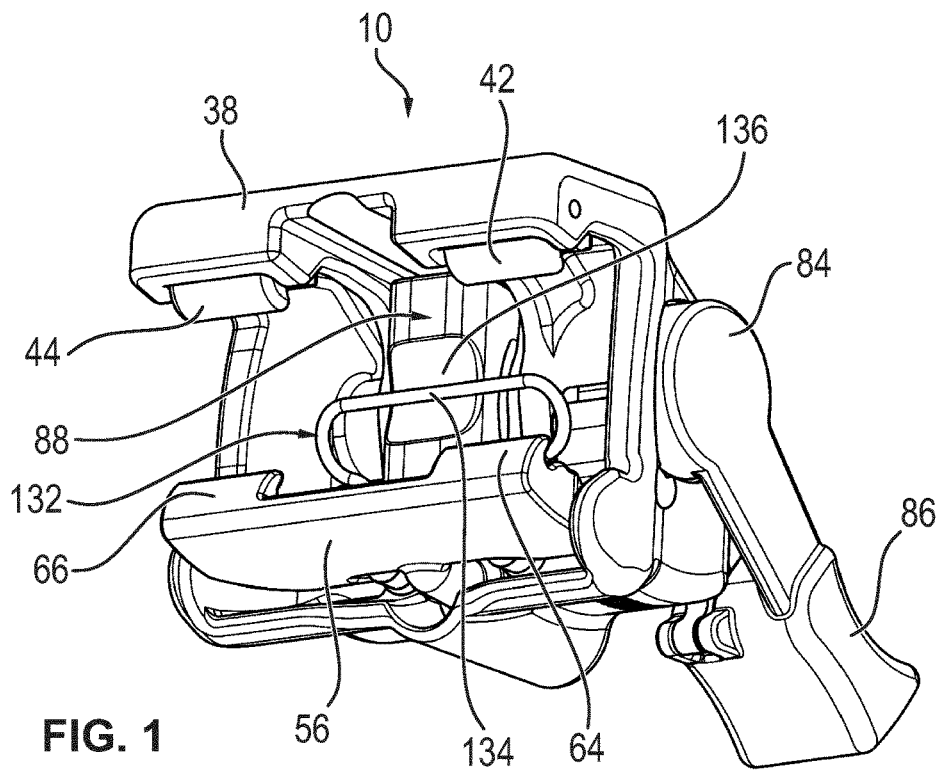
FIG. 1, a perspective view of an exemplary clamping claw according to the invention.
Figure 2:
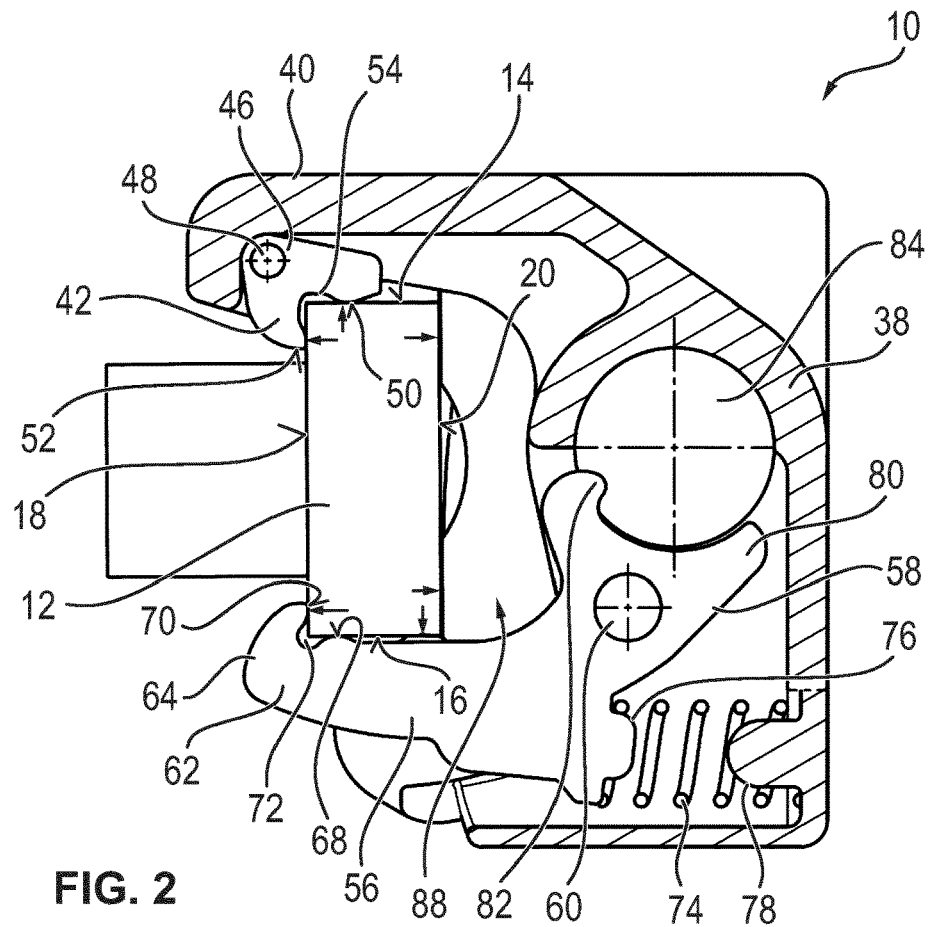
FIG. 2, a sectional side view of the exemplary clamping claw mounted on a sliding rail.
Figure 4:
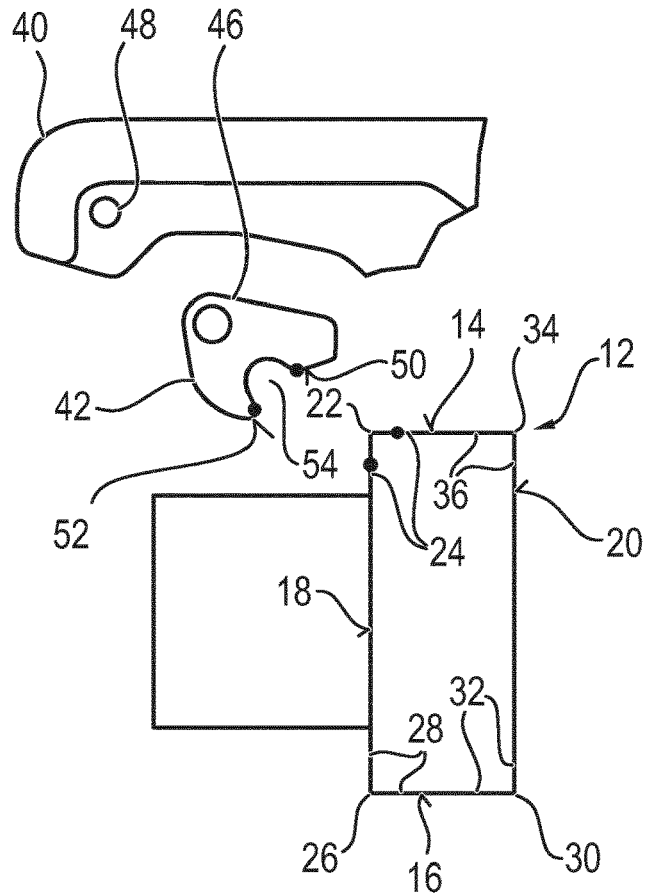
FIG. 4, a side view of parts of the exemplary clamping claw to illustrate how a swash cam according to the invention engages with the sliding rail.
Figure 5:
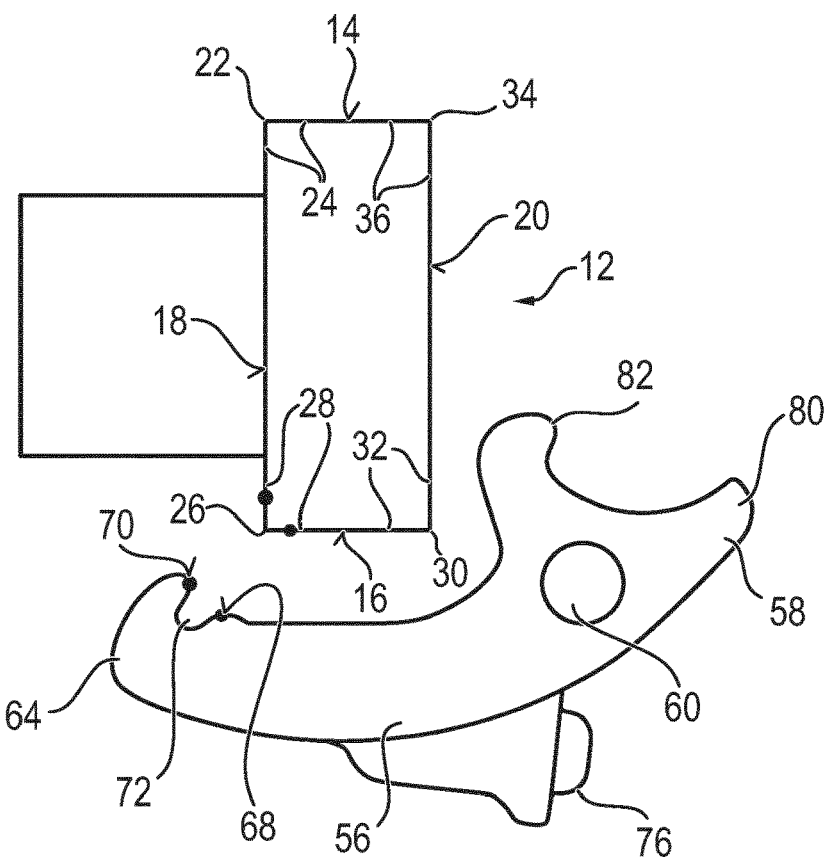
FIG. 5, a side view of parts of the exemplary clamping claw to illustrate how a swivel bar according to the invention engages with the sliding rail.

FIGS. 1 and 2 show in perspective view and in sectional side view a clamping claw 10, serving to mount an accessory on a sliding rail 12 of an operating table. As is also shown in FIGS. 4 and 5, the sliding rail 12 may have a rectangular cross section. Accordingly, the sliding rail 12 may have an upper rail surface 14 and, parallel with this, a lower rail surface 16, as well as an inner rail surface 18 and, parallel to this, an outer rail surface 20. Between the upper rail surface 14 and the inner rail surface 18 there may be a rail edge 22, which may extend in the lengthwise direction of the sliding rail 12 (e.g., perpendicular to the plane of the drawing in the representation of FIG. 2). The regions of the upper rail surface 14 and the inner rail surface 18 directly adjoining this rail edge 22 are, for example, designated together as the edge region 24 (e.g., rail edges may be similarly designated as 26, 30 and 34 in FIGS. 4 and 5 and the edge regions coordinated with them, designated as 28, 32 and 36). For example, each edge region (e.g., 24, 28, 32, and 36) may include a respective edge (e.g., 22, 26, 30, and 34) that is disposed between two operating table member surfaces (e.g., 14 and 18, 16 and 18, 14 and 20, and 16 and 20) that are angled relative to each other. Edges 22, 26, 30, and 34 may be, for example, corners and/or fillet edges or portions of the sliding rail 12.

Figure 3:
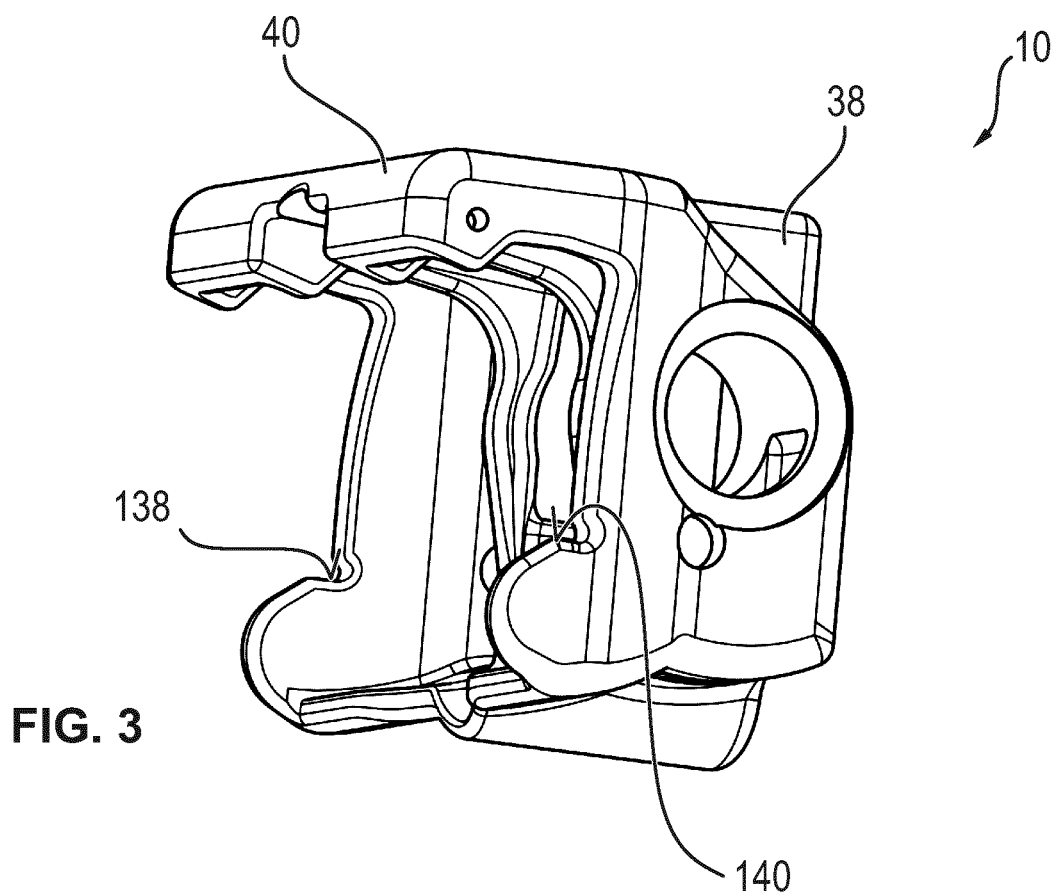
FIG. 3, a perspective view of an exemplary base body of the clamping claw.

The clamping claw 10 may have, for example, a hook-shaped base body 38 (e.g., shown standing alone in FIG. 3). In an upper section 40 of the base body 38, which may embrace the sliding rail 12 from above when the clamping claw 10 is mounted, there may be two swash cams 42 and 44, mounted on a pivot. The two swash cams 42 and 44 may be oriented to each other in parallel with the longitudinal axis of the sliding rail 12. The two swash cams 42 and 44 may be similar in construction, with the swash cam 42 shown in FIGS. 2 and 4 being described below in detail.

As illustrated in FIG. 2, the swash cam 42 may be pivotally mounted about a pin 48 in a cam region designated as 46, being firmly mounted in the base body 12. The mounted cam region 46 of the swash cam 42 may have a curved outer surface, which may lie against a correspondingly concave curved abutment, located on the inner side of the base body 38. For example, the swash cam 42 may have at its free end (e.g., the one not mounted) two convex arched contact surfaces 50 and 52, as well as a concave edge recess 54 arranged between the contact surfaces 50 and 52.

When the clamping claw 10 is mounted on the sliding rail 12, the two contact surfaces 50, 52 of the swash cam 42 may lie in the edge region 24 on the upper rail surface 14 and the inner rail surface 18, respectively, while the rail edge 22 may be taken up without contact in the edge recess 54. The swash cam 42 may thus embrace the sliding rail 12 in the edge region 24 so that the rail edge 22 is recessed (for example, such that the rail edge 22 has substantially no contact with the swash cam 42). For example, most or substantially all of rail edge 22 may have substantially no contact with the swash cam 42. Also, for example, the edge recess 54 may receive the edge region 24 of an operating table member (e.g., sliding rail 12) without the rail edge 22 of the operating table member (e.g., sliding rail 12) contacting a surface of the edge recess 54. Further, for example, the edge recess 54 may receive the edge region 24 of the operating table member without contact other than the first and second contact surfaces (e.g., 50 and 52) bearing against the first and second operating table member surfaces (e.g., 14 and 18), respectively. The bearing on the sliding rail 12 may occur (e.g., solely) through the two contact surfaces 50, 52 of the swash cam 42, each of them making line contact (e.g., bearing contact) with the upper rail surface 14 and the inner rail surface 18, respectively. This line contact is indicated, for example, by arrows in the side view of FIG. 2 and by dots on the contact surfaces 50, 52 and dots on the rail surfaces 14, 18 in the edge region 24 in the side view of FIG. 4.

The swash cam 42 may for example form a bearing element, which may ensure that, for example, only the upper rail surface 14 and the inner rail surface 18 of the sliding rail 12 are used to channel the load (e.g., transfer the load), while the rail edge 22 itself remains unloaded For example, only the upper rail surface 14 and the inner rail surface 18 of the sliding rail 12 may be used to channel (e.g., transfer) the load. The same may occur with respect to the other swash cam 44.

Another bearing element may be formed by a swivel bar 56, which may be mounted by one end 58 to swivel about a pin 60, which may be firmly mounted in the base body 38. At a free end 62 of the swivel bar 56 located opposite from the mounted end 58 there may be two contact regions 64 and 66, which may be for example spaced apart from each other in the lengthwise direction of the sliding rail 12. The contact regions 64 and 66 may be similar in construction, with contact region 64 as shown in FIGS. 2 and 5 being described below.

At the contact region 64 two convex arched contact surfaces 68 and 70 may be formed, between which a convex shaped edge recess 72 may be disposed. In the locked state, the two contact surfaces 68 and 70 may lie in the edge region 28 against the lower rail surface 16 and the inner rail surface 18. On the other hand, the rail edge 26 may be taken up without contact in the edge recess 72. The bearing of the two contact surfaces 68 and 70 may occur by a line contact as also with the swash cams 42 and 44. The line contact is illustrated by arrows in the exemplary embodiment of FIG. 2 and by dots in the exemplary embodiment of FIG. 5.

As shown in FIG. 2, the swivel bar 56 may be pretensioned by a compression spring 74, so that the contact surface 68 of the swivel bar 56 is pressed upward against the lower rail surface 16. The compression spring 74 may be clamped between a shoulder 76 formed on the swivel bar 56 and a peg 78 formed on the base body 38. Two control levers 80 and 82 may be disposed at the mounted end 58 of the swivel bar 56.

Figure 11:
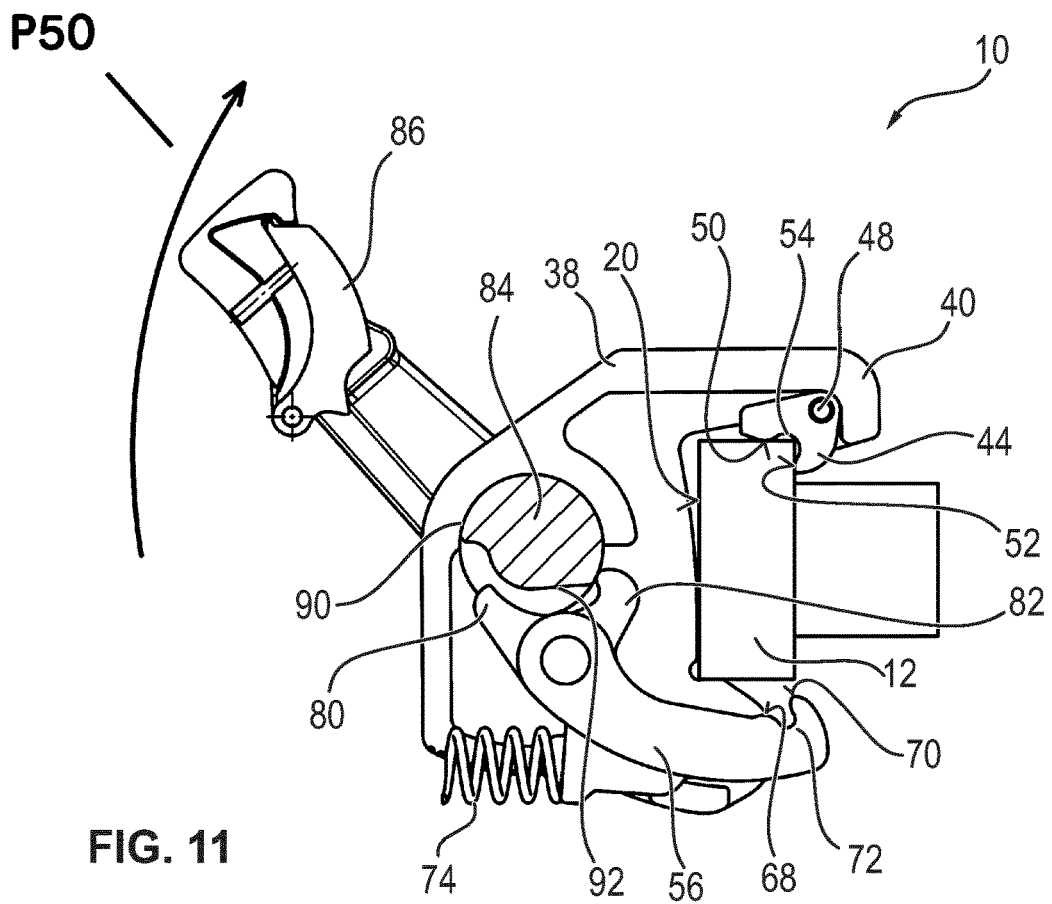
FIG. 11, a side view showing the exemplary sliding rail and the exemplary clamping claw in an opened position.
Figure 13:
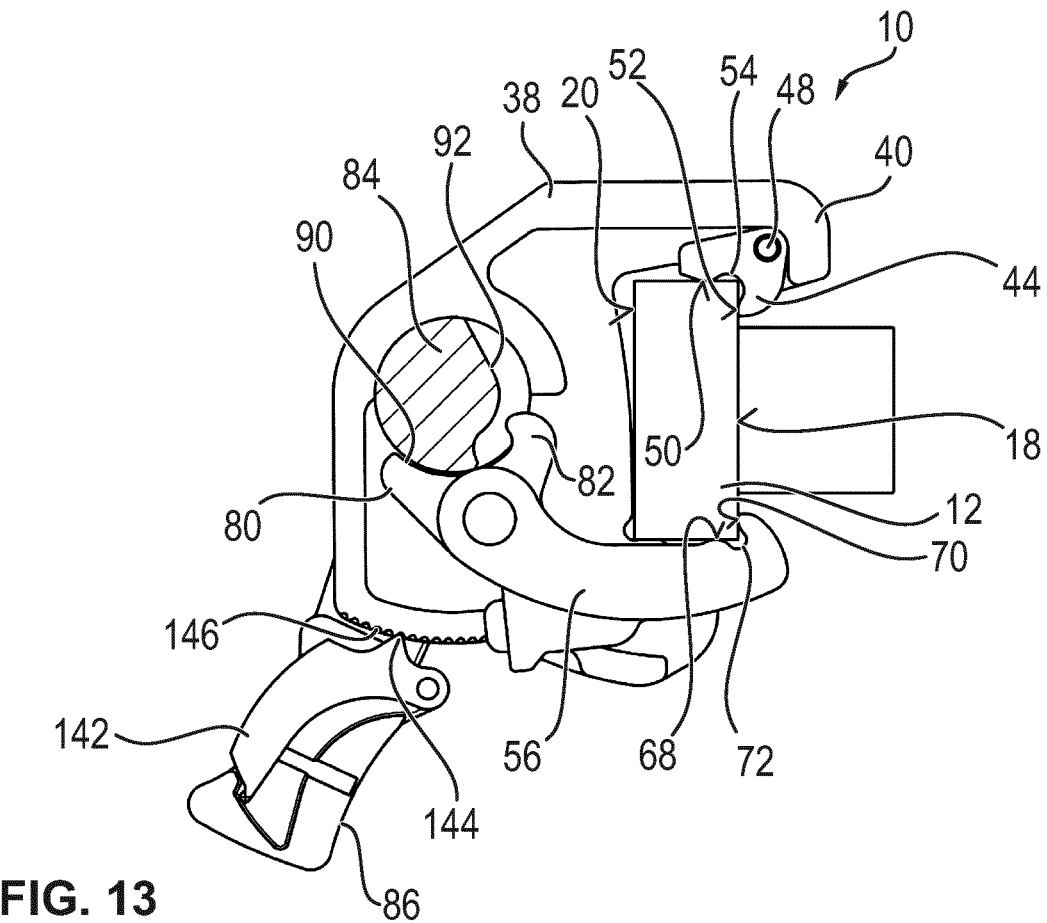
FIG. 13, a side view, showing the exemplary sliding rail and the exemplary clamping claw in a locked position.

Further for example, a cam 84 may be swivel-mounted in the base body 38 of the clamping claw 10. The cam 84 may be coupled to an activating member (such as, for example, an activating lever 86) and may serve to press a clamping block 88 against the outer rail surface 20, which may be unaffected by the swash cams 42, 44 and the swivel bar 56 (e.g., as described with reference to the below exemplary embodiments), in order to secure the clamping claw 10 against the sliding rail 12. The cam 84 may influence the movement of the swivel bar 56. For example, as shown in FIGS. 11 and 13, two control lobes 90 and 92 may be formed on the cam 84, which may interact with the control levers 80, 82 of the swivel bar 56. For example, the swash cams 42, 44, the swivel bar 56, the compression spring 74, the cam 84, and/or the clamping block 88 may form a clamp assembly (e.g., clamp structure). Also, for example, the swash cams 42, 44 and/or the swivel bar 56 may form a bearing element (e.g., a bearing member).

Figure 6:
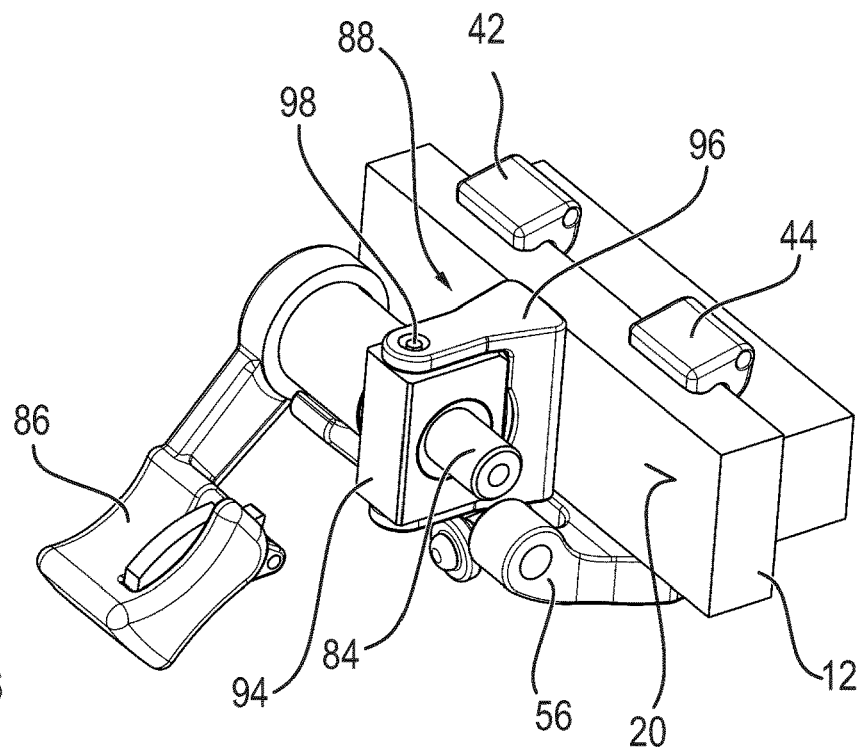
FIG. 6, a perspective view showing in particular an exemplary clamping block according to a first exemplary embodiment.
Figure 7:
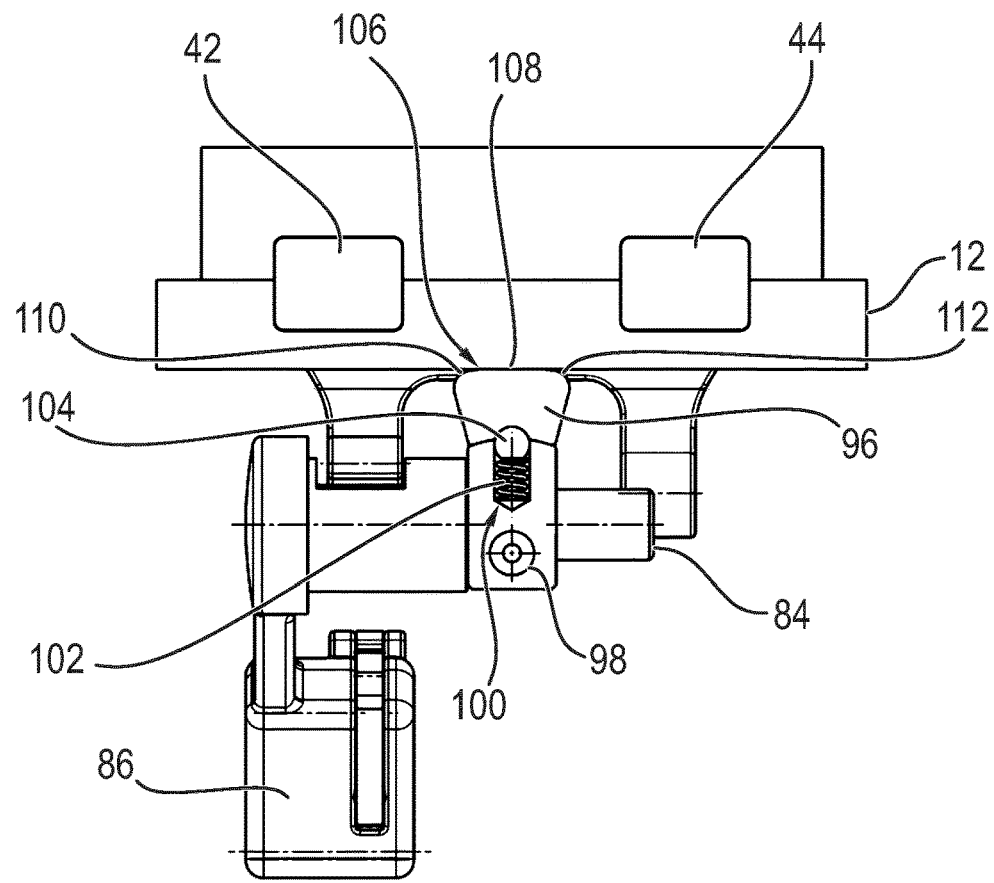
FIG. 7, a partly sectional top view, showing in particular the exemplary clamping block according to the first exemplary embodiment.

FIGS. 6 and 7 show a first exemplary embodiment of the clamping block 88. In this first exemplary embodiment, the clamping block 88 may be formed from a pressing piece 94 and a bearing shoe 96. The bearing shoe 96 may be mounted on the pressing piece 94 and be able to swivel about a vertical axis 98. A spring-loaded detent element 100, which may be formed from a compression spring 102 and one or more balls 104 acted upon by the compression spring 102, may hold the bearing shoe 96 in a middle base position, as shown in FIG. 7. The bearing shoe 96 may have a clamping surface 106 facing the sliding rail 12, which may be formed from a central, planar surface segment 108 and two surface segments 110 and 112, arching away from the sliding rail 12 and adjoining the planar surface segment 108 at the sides (for example, as shown at the left and right in FIG. 7).

If the activating lever 86 is swiveled downward per FIG. 6, the cam 84 coupled with the activating lever 86 may press the pressing piece 94 in the direction of the sliding rail 12. Accordingly, the bearing shoe 96 which is swivel-connected to the pressing piece 94 may press against the outer rail surface 20 of the sliding rail 12.

The above explained two-part design of the clamping block 88 may provide for the clamping claw 10 being securely clamped on the sliding rail 12 without slipping in the lengthwise direction of the sliding rail 12. Thus, due to the shape of the clamping surface 106 of the bearing shoe 96 and the swiveling connection between the bearing shoe 96 and the pressing piece 94, a swiveling of the bearing shoe 96 from its middle base position (see FIG. 7) may be accomplished. On the other hand for example, if the bearing shoe 96 and the pressing piece 94 were rigidly joined together, the sliding rail 12 bearing against the clamping surface 106 with a certain pretension may move in its lengthwise direction when the force acting on the clamping claw 10 overcomes the frictional resistance between the sliding rail 12 and the bearing shoe 96.

Figure 8:
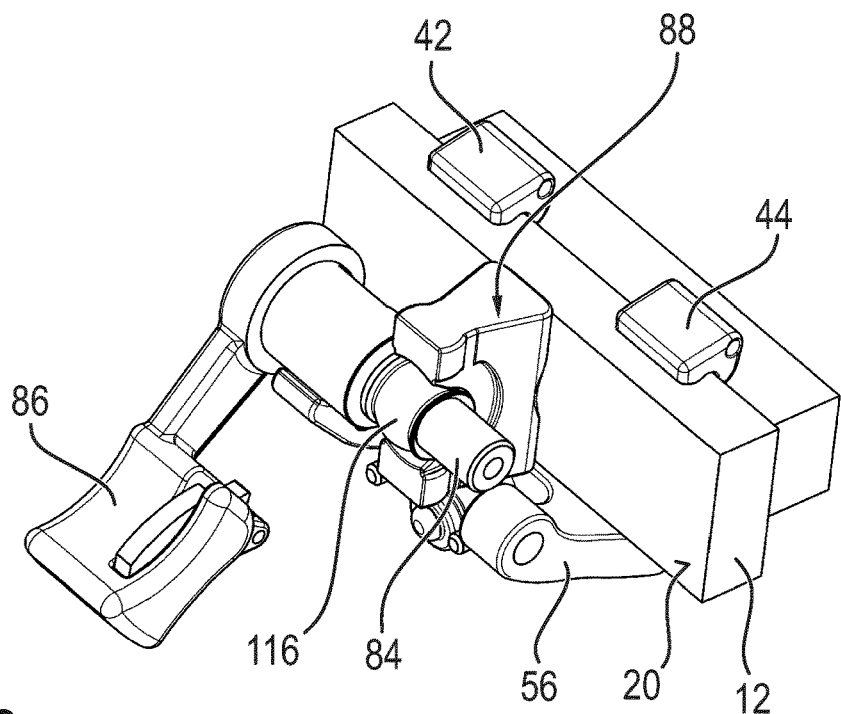
FIG. 8, a perspective view, showing in particular an exemplary clamping block according to a second exemplary embodiment.
Figure 9:
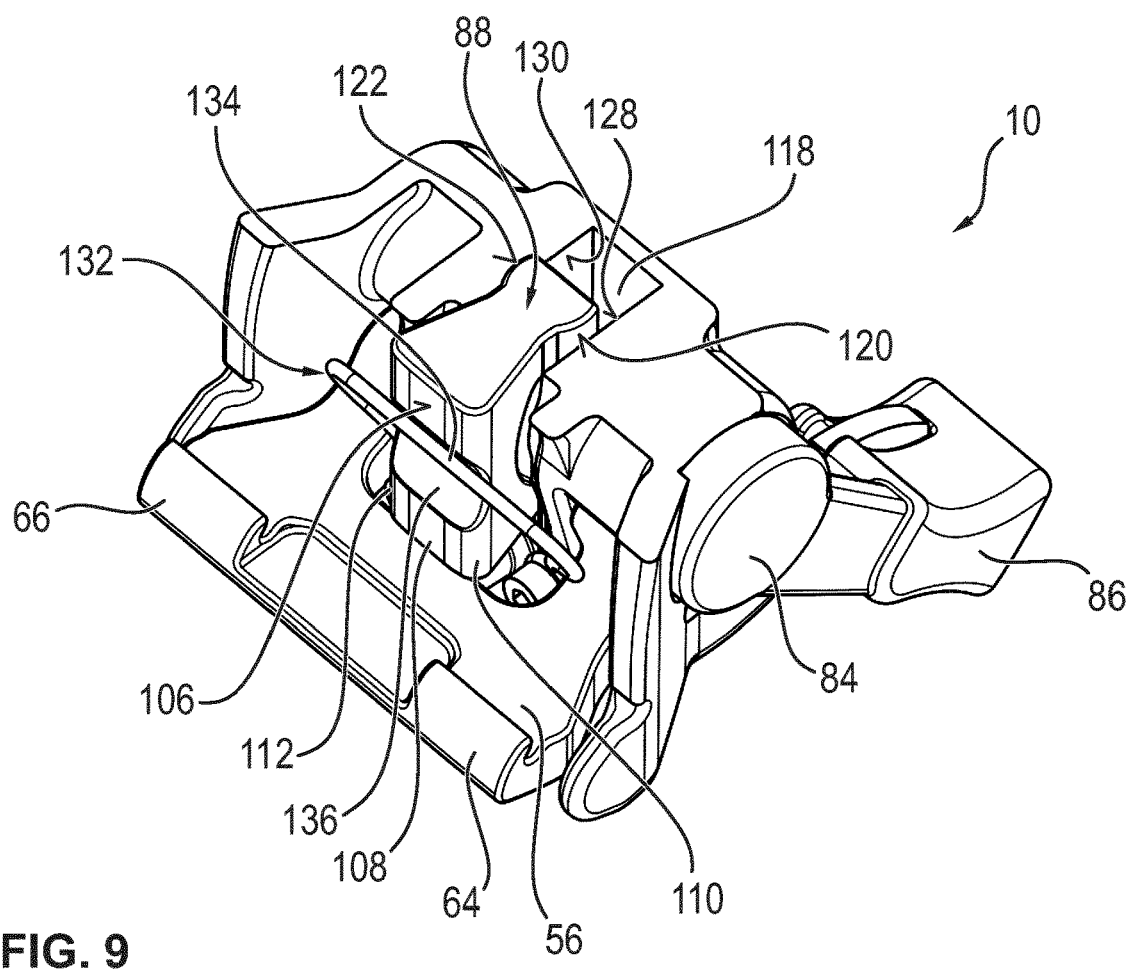
FIG. 9, another perspective view, showing in particular the exemplary clamping block according to the second exemplary embodiment.
Figure 10:
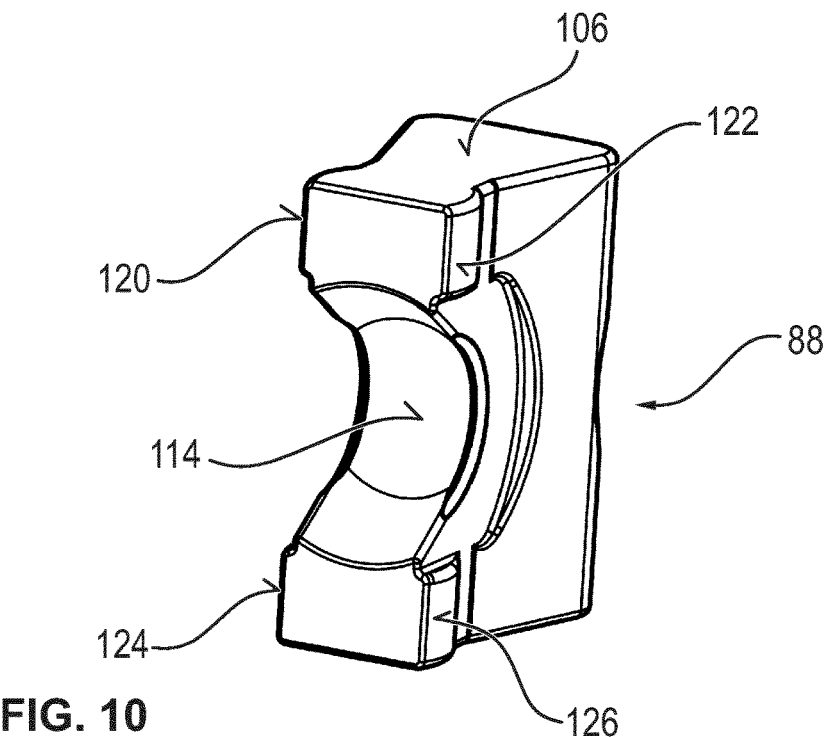
FIG. 10, a perspective view, showing the exemplary clamping block according to the second exemplary embodiment standing alone.

FIGS. 8, 9 and 10 show a second embodiment of the clamping block 88. This second embodiment may include the clamping block 88 being fashioned, for example, as a single piece. The clamping surface 106 of the clamping block 88 may be formed from the central surface segment 108 and the two arched surface segments 110, with surface segment 112 adjoining the central surface segment 108 at the sides. The one-piece clamping block 88 according to FIG. 10 may have a bearing surface 114 facing away from its clamping surface 106, which may be fashioned as a concave spherical surface. On the cam 84, for example, a correspondingly convex spherical pressing surface 116 may be provided, as shown in FIG. 8. Due to this configuration, the clamping block 88 can move about a horizontal axis lying parallel with the lengthwise axis of the sliding rail 12 as well as a vertical axis perpendicular to it.

The clamping block 88 may be arranged with its end facing away from the clamping surface 106 in a seat 118 fashioned in the base body 38, as shown in FIG. 9. The clamping block 88 may lie (e.g., bear) with two convex shaped bearing surfaces 120, 122, which may be fashioned above at the end of the clamping block facing away from the clamping surface 106, and two convex shaped bearing surfaces 124, 126, which may be fashioned below at the end of the clamping block 88 facing away from the clamping surface 106, against abutments which may be situated in the seat 118. For example, of the four abutments coordinated with the four bearing surfaces 120, 122, 124, 126, only the upper two abutments are shown in FIG. 9 and are designated there as 128 and 130. Due to the contact of the bearing surfaces 120, 122, 124, 126 and the corresponding abutments 128, 130, for example, a rotation of the clamping block 88 about a horizontal axis lying perpendicular to the lengthwise direction of the sliding rail 12 may be substantially prevented. Also for example, a displacement along the sliding rail 12 may also be prevented.

The clamping claw 10 may have a yoke spring 132, which may be fastened by its two yoke ends to the base body 38. The two yoke ends may be joined together by a yoke segment 134, which may lie in a recess 136 that may be fashioned in the clamping surface 106 of the clamping block 88. The yoke spring 132 may make a closure of force (e.g., a closure of suitable force) with the cam 84. Furthermore, the yoke spring 132 may provide for the middle alignment of the clamping block 88 in the unloaded state.

Also for example, clamping block 88 can be oriented by rotation about the cam 84 on the outer rail surface 20 when the clamping block 88 approaches the rail surface 20 and is tightened on the rail surface 20. When loaded in the lengthwise direction of the sliding rail 12, the clamping block 88 can swivel about a vertical axis and thus again bring about the desired clamping. The axial forces which occur may be channeled by (e.g., transferred via) the bearing surfaces 120, 122, 124 and 126 from the clamping block 88 to the base body 38 of the clamping claw 10.

Figure 12:
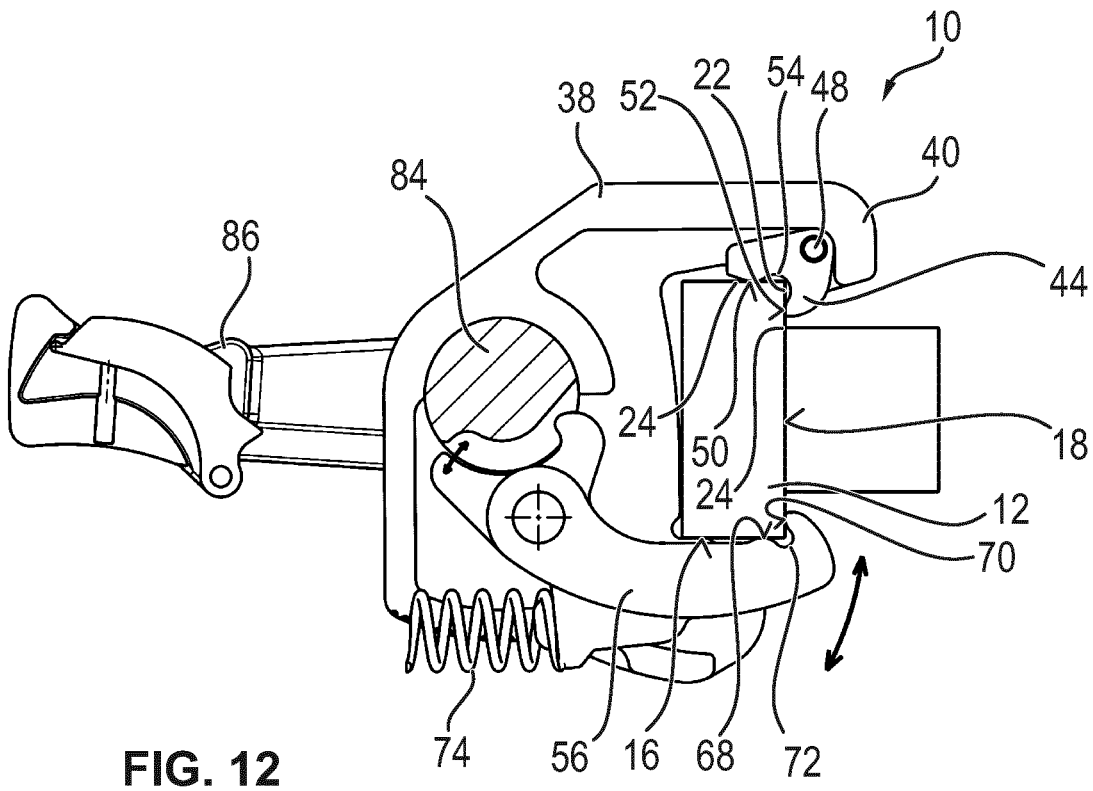
FIG. 12, a side view, showing the exemplary sliding rail and the exemplary clamping claw in a secured base position.

Referring to FIGS. 11, 12 and 13, the manner in which the clamping claw 10 is mounted on the sliding rail 12 and locked at sliding rail 12 will be described.

In order to mount the clamping claw 10, the activating lever may be placed in a horizontal position, as shown in FIG. 12. In this lever position, the cam 84, which is coupled to the activating lever 86, may not be engaged with the swivel bar 56. Thus, the clamping claw 10 may be placed on the sliding rail 12 and swiveled in that location. The swash cams 42, 44, of which for example the swash cam 44 is shown in FIGS. 11, 12 and 13, may lie against the edge region 24 of the sliding rail 12, and the clamping claw 12 may swivel with its upper segment around the upper inner rail edge 22 until the base body 38 comes to a halt on the outer rail surface 20.

The swivel bar 56, loaded by the compression spring 74 and in the unlocked cam position shown in the FIG. 12, may slide past the lower rail surface 16 and may snap in at the inner rail surface 18. The compression spring 74 may press the swivel bar 56 with the contact surface 68 against the lower rail surface 16, while the other contact surface 70 of the swivel bar 56 in the unloaded state may still have no contact with the inner rail surface 18. However, a swivel out of the clamping claw 10 opposite to this swivel in movement may no longer be possible, since this swiveling may be prevented by the bearing of the contact surface 70 of the swivel bar 56 against the inner rail surface 18. Thus, the clamping claw 10 may for example already be secured against dropping off, yet the clamping claw 10 may still be freely movable on the sliding rail. The state shown in FIG. 12 can therefore be called the secured base position.

FIG. 13 shows an exemplary locked state of the clamping claw 10, which may be achieved in that the activating lever 86, starting from the secured base position of FIG. 12, is swiveled downward. Due to this swiveling of the activating lever 86, the cam 84 may approach the outer rail surface 20. The control lobe 90 in concert with the corresponding control lever 80 of the swivel bar 56 may prevent the swivel bar 56 in the closed state from being placed by the action of external forces in an opening position, releasing the sliding rail 12.

The clamping block 88, as described above, can sway in a narrow range about the lengthwise axis of the cam 84 and straighten out upon approaching the outer rail surface 20. The force channeled (e.g., transferred) by the outer rail surface 20 may again be returned to the base body 38 of the clamping claw 10 at the inner rail surface 18 via the contact surface 70 below and via the contact surface 50 of the swash cam 44 (or 42) above. Since the swash cam 42 may be braced by the rounded lobe region 46 against the base body 38 of the clamping claw 10, the channeling of force (e.g., transfer of force) via the contact surface 52 may bring about a rotation of the swash cam 42 until the contact surface 50 comes to bear against the upper rail surface 14 and moves it in the vertical direction toward bearing surfaces 138, 140, which may be fashioned on the base body 38 (e.g., as shown in FIG. 3). Thus, the sliding rail 12 starting from a horizontal closing movement may be clamped both horizontally and vertically.

FIG. 11 shows an exemplary opened position of the clamping claw 10, in which the activating lever 86 has been swiveled upward. If the activating lever 86 is swiveled upward, the control lobe 92 of the cam 84 may run against the control lever 82 of the swivel bar 56, so that the latter is pressed downward against the prestressing force exerted by the compression spring 74. This may release the sliding rail 12, so that the clamping claw 10 can be swiveled out.

A spontaneous snap back from the locked position shown in FIG. 13 to the base position shown in FIG. 12, for example due to vibration or unintended activation, may be prevented by a locking lever 142, which may be fashioned on the activating lever 86 and engaged by a spring-loaded lug 144 in a series of counter teeth 146 (e.g., which are arranged on the base body 38). For example by activating the locking lever 142 it may be possible to return the cam 84 to the unlocked (yet secured) base position of FIG. 12.

As explained above, the clamping claw 10 may be clamped on the sliding rail 12 by the rail surfaces 14, 16, 18 and 20, but not by the rail edges 22, 26, 30 and 34 (e.g., only by the rail surfaces 14, 16, 18 and 20). Therefore, the cam 84 may compensate for the dimension tolerances of the sliding rail 12 in the horizontal and vertical direction, while not compensating for the different edge fillets (e.g., it is not appropriate for the different edge fillets to be considered in regard to the operation of clamping claw 10). In this way, the eccentricity of the cam 84 can be kept small.

Due to the relatively large leverage ratio between the activating lever 86 and the cam 84, relatively large normal forces can be exerted on the sliding rail 12.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and the disclosed examples be considered as exemplary only, with a true scope being indicated by the following claims.

What is claimed is:

1. An operating table clamp for mounting on an operating table member, comprising:
   a base body;
   a clamp assembly disposed on the base body, the clamp assembly having a bearing member configured to bear against the operating table member; and
   an activating member that is connected to the clamp assembly, the clamp assembly being brought by the activating member into a locked state in which the bearing member of the clamp assembly bears against the operating table member;
   wherein in the locked state of the clamp assembly, the bearing member engages with an edge region of the operating table member, the edge region including an edge that is disposed between a first operating table member surface and a second operating table member surface, the first and second operating table member surfaces being angled relative to each other;
   wherein the bearing member includes a first contact surface, a second contact surface, and an edge recess, the edge recess being disposed between the first and second contact surfaces;
   wherein the first contact surface bears against the first operating table member surface, and the second contact surface bears against the second operating table member surface;
   wherein the edge recess receives the edge region of the operating table member without the edge of the operating table member contacting a surface of the edge recess; and
   wherein the bearing member comprises a swivel bar having a first end and a second end, the swivel bar being pivotally mounted at its first end at the base body, and the swivel bar having two convex arched surfaces forming said first contact surface and said second contact surface at the second end of the swivel bar.

2. The operating table clamp of claim 1, wherein the edge recess receives the edge region of the operating table member without contact other than the first and second contact surfaces bearing against the first and second operating table member surfaces, respectively.

3. The operating table clamp of claim 1, wherein bearing of the bearing member on the operating table member occurs solely by the first contact surface bearing against the first operating table member surface, and the second contact surface bearing against the second operating table member surface.

4. The operating table clamp of claim 1, wherein the clamp assembly has a movably mounted clamping block, which is operatively connected to the activating member and has a clamping surface that can be tightened against a surface of the operating table member not contacted by the bearing member by pressing the activating member.

5. The operating table clamp of claim 4, wherein the clamp assembly has a cam coupled with the activating member and mounted at the base body, which presses the clamping surface of the clamping block against the surface of the operating table member not contacted by the bearing member when the activating member is activated.

6. The operating table clamp of claim 4, wherein the clamping block is formed from a pressing piece operatively connected to the activating member and a bearing shoe, provided with the clamping surface, which is mounted so that it can pivot on the pressing piece.

7. The operating table clamp of claim 4, wherein the clamping surface of the clamping block is formed from a central, planar surface segment and two arched surface segments adjoining the planar surface segment at the sides.

8. The operating table clamp of claim 1:
   the operating table clamp being configured for mounting wherein said operating table member is a rail;
   wherein said bearing member is a first bearing member, the operating table clamp further comprising a second bearing member;
   wherein the second bearing member is configured to bear against the rail;
   wherein in the locked state of the clamp assembly the second bearing member engages a second edge region of the rail;
   wherein in the locked state of the clamp assembly, the first bearing member engages with a first edge region of the rail, the first edge region including a first edge that is disposed between a first rail surface and a second rail surface, the first and second rail surfaces being angled relative to each other;

wherein in the locked state of the clamp assembly, the second bearing member engages with a second edge region of the rail, the second edge region including a second edge that is disposed between a third rail surface and a fourth rail surface, the third and fourth rail surfaces being angled relative to each other;

wherein the second bearing member includes a third contact surface, a fourth contact surface, and a second edge recess, the second edge recess being disposed between the third and fourth contact surfaces;

wherein the first contact surface bears against the first rail surface, the second contact surface bears against the second rail surface, the third contact surface bears against the third rail surface, and the fourth contact surface bears against the fourth rail surface;

wherein the first edge recess receives the first edge region of the rail without the first edge of the rail contacting a surface of the first edge recess; and wherein the second edge recess receives the second edge region of the rail without the second edge of the rail contacting a surface of the second edge recess.

9. The operating table clamp of claim 1:
wherein the activating member is a swivel lever with a locking lug, which in the locked state engages in a releasable manner with a toothing disposed on the base body.

10. The operating table clamp of claim 1:
wherein the operating table clamp further includes a swash cam that is swivel-mounted on the base body, the swash cam including two convex arched surfaces as contact surfaces.

11. The operating table clamp of claim 1:
the operating table clamp being configured for mounting wherein said operating table member is a rail;
wherein the activating member comprises a swivel lever;
wherein the swivel lever is connected to the clamp assembly, the clamp assembly being brought by the swivel lever into a locked state in which the bearing member of the clamp assembly bears against the rail.

12. The operating table clamp of claim 1:
wherein said bearing member is a first bearing member, the operating table clamp further comprising a second bearing member;
wherein the second bearing member comprises a third contact surface, a fourth contact surface, and a second edge recess disposed between the third and fourth contact surfaces;
wherein the first bearing member and the second bearing member are positioned to engage different respective portions of the operating table member.

13. The operating table clamp of claim 1:
wherein the clamp assembly has a prestressing element that prestresses the swivel bar when the swivel bar is in a swivel position in which at least one of the two convex arched surfaces of the swivel bar presses against a surface of the rail.

14. The operating table clamp of claim 1:
the operating table clamp being configured for mounting wherein said operating table member is an elongated rail having a rectangular cross-section, wherein said edge region comprises a corner of the rail where the first operating table member surface and the second operating table member surface meet, said first operating table member surface and second operating member surface being planar sides of the rail;
the bearing member being shaped so that the first contact surface and second contact surface contact different planar surfaces of the rail, and so that the edge recess receives said corner of the rail.

15. An operating table clamp for mounting on an operating table member, comprising:
a base body;
a clamp assembly disposed on the base body, the clamp assembly having a bearing member configured to bear against the operating table member; and
an activating member that is connected to the clamp assembly, the clamp assembly being brought by the activating member into a locked state in which the bearing member of the clamp assembly bears against the operating table member;
wherein in the locked state of the clamp assembly, the bearing member engages with an edge region of the operating table member, the edge region including an edge that is disposed between a first operating table member surface and a second operating table member surface, the first and second operating table member surfaces being angled relative to each other;
wherein the bearing member includes a first contact surface, a second contact surface, and an edge recess, the edge recess being disposed between the first and second contact surfaces;
wherein the first contact surface bears against the first operating table member surface, and the second contact surface bears against the second operating table member surface;
wherein the edge recess receives the edge region of the operating table member;
wherein the clamp assembly comprises a movably mounted clamping block which is operatively connected to the activating member, and which has a clamping surface that can be tightened against a surface of the operating table member by pressing the activating member;
wherein the clamping block comprises:
a pressing piece operatively connected to the activating member, and
a bearing shoe which comprises the clamping surface, which is mounted so that it can pivot on the pressing piece.

16. The operating table clamp of claim 15, wherein the bearing shoe is held by a spring-loaded detent element in a predetermined swivel position.

17. The operating table clamp of claim 15:
wherein the edge recess receives the edge region of the operating table member without the edge of the operating table member contacting a surface of the edge recess.

18. The operating table clamp of claim 1:
wherein the bearing member further comprises a third contact surface, a fourth contact surface, and a second edge recess, the second edge recess being disposed between the third and fourth contact surfaces;
wherein the third contact surface is lateral to the first contact surface, and the fourth contact surface is lateral to the second contact surface; and
wherein the third contact surface bears against the first operating table member surface, and the fourth contact surface bears against the second operating table member surface.

19. The operating table clamp of claim 1:
further comprising at least one swash cam movably mounted on the base body, the swash cam including two movable contact surfaces, the two movable contact surfaces being positioned for respectively contacting said second operating table member surface and a third operating member surface.

20. An operating table clamp for mounting on an operating table member, comprising:
a base body;
a clamp assembly disposed on the base body, the clamp assembly having a bearing member configured to bear against the operating table member; and
an activating member that is connected to the clamp assembly, the clamp assembly being brought by the activating member into a locked state in which the bearing member of the clamp assembly bears against the operating table member;
wherein in the locked state of the clamp assembly, the bearing member engages with an edge region of the operating table member, the edge region including an edge that is disposed between a first operating table member surface and a second operating table member surface, the first and second operating table member surfaces being angled relative to each other;
wherein the bearing member includes a first contact surface, a second contact surface, and an edge recess, the edge recess being disposed between the first and second contact surfaces;
wherein the first contact surface bears against the first operating table member surface, and the second contact surface bears against the second operating table member surface;
wherein the edge recess receives the edge region of the operating table member;
wherein the bearing member comprises a swivel bar having a first end and a second end, the swivel bar being pivotally mounted at its first end at the base body, and the swivel bar having two convex surfaces forming said first contact surface and said second contact surface;
wherein the bearing member further comprises a third contact surface, a fourth contact surface, and a second edge recess, the second edge recess being disposed between the third and fourth contact surfaces;
wherein the third contact surface is lateral to the first contact surface, and the fourth contact surface is lateral to the second contact surface;
wherein the third contact surface bears against the first operating table member surface, and the fourth contact surface bears against the second operating table member surface.

* * * * *